US008233861B1

(12) United States Patent
Cripe et al.

(10) Patent No.: US 8,233,861 B1
(45) Date of Patent: Jul. 31, 2012

(54) SWITCHED IMPEDANCE SYNTHESIS TRANSMIT ANTENNA MATCHING SYSTEM FOR ELECTRICALLY SMALL ANTENNA RADIATORS

(75) Inventors: David W. Cripe, Mount Vernon, IA (US); Scott L. Patten, Marion, IA (US); Jeremiah D. Wolf, Cedar Rapids, IA (US); James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 980 days.

(21) Appl. No.: 12/284,638

(22) Filed: Sep. 24, 2008

(51) Int. Cl.
*H04B 1/04* (2006.01)

(52) U.S. Cl. ........................ 455/129; 455/123; 455/550.1

(58) Field of Classification Search .................... 455/75, 455/76, 108, 109, 118–121, 122, 123, 129, 455/550.1
See application file for complete search history.

(56) References Cited

U.S. PATENT DOCUMENTS

| 5,349,700 A * | 9/1994 | Parker ...................... 455/193.2 |
| 6,381,286 B1 * | 4/2002 | Wilkinson et al. ............ 375/296 |
| 6,486,795 B1 * | 11/2002 | Sobel et al. ................. 340/13.21 |
| 7,421,252 B2 * | 9/2008 | Kirschenmann et al. ....... 455/85 |
| 8,140,030 B2 * | 3/2012 | Takinami et al. ............. 455/108 |

* cited by examiner

*Primary Examiner* — Nhan Le
(74) *Attorney, Agent, or Firm* — Donna P. Suchy; Daniel M. Barbieri

(57) ABSTRACT

A system for transmitting a broadband signal over an electrically short antenna which includes a plurality of switched impedance synthesis transmit antenna matching circuits which are dynamically controlled with knowledge of the transmitting broadband signal to match the dynamic impedance of the electrically short antenna during transmission.

3 Claims, 3 Drawing Sheets

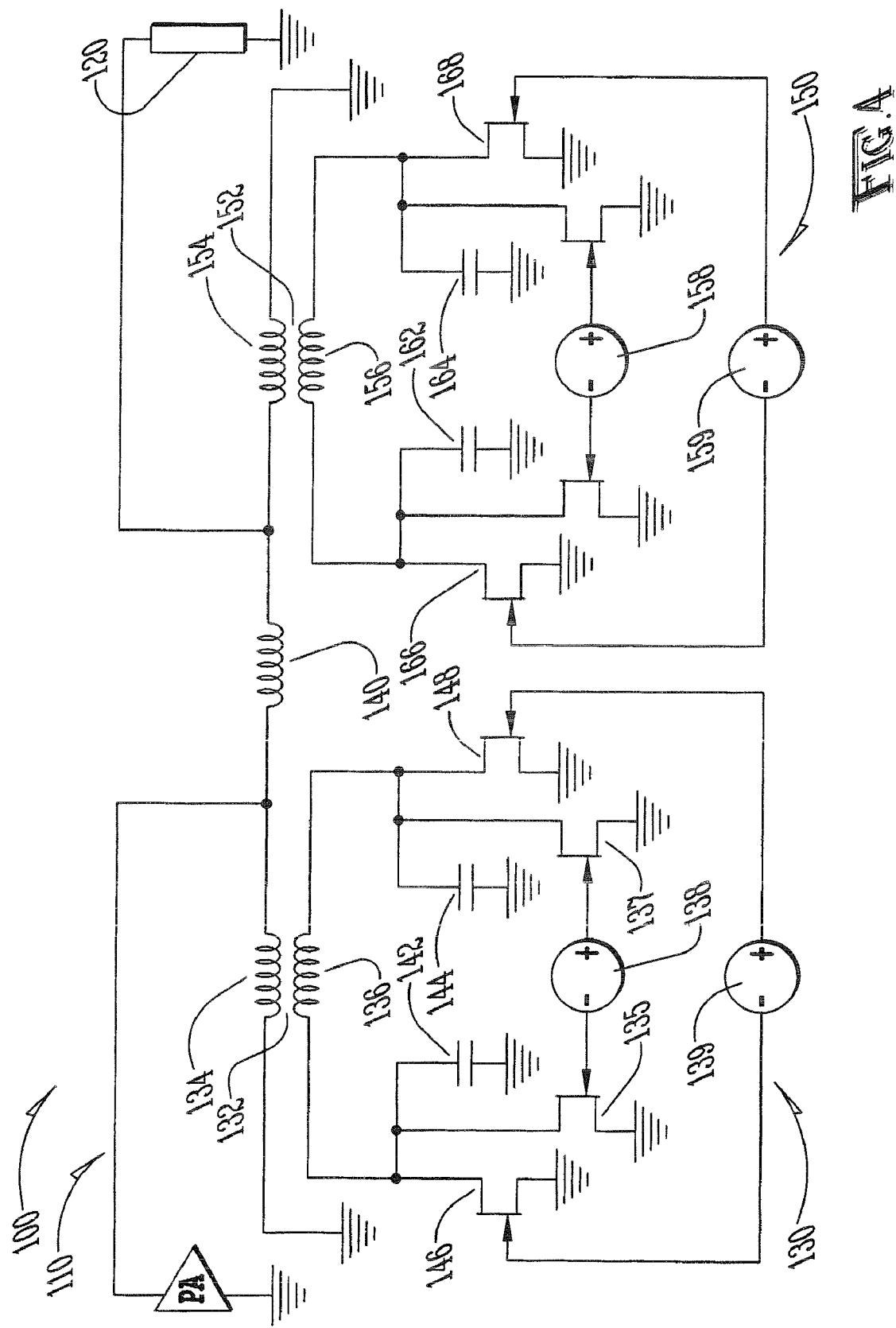

SWITCHED IMPEDANCE SYNTHESIS TRANSMIT ANTENNA MATCHING SYSTEM FOR ELECTRICALLY SMALL ANTENNA RADIATORS

FIELD OF THE INVENTION

The present invention generally relates to an impedance matching system for electrically small antennas which comprises a plurality of customizable building block circuits each configured for synthesizing an arbitrary impedance.

BACKGROUND OF THE INVENTION

For many years, It has been well understood that the performance of an antenna diminishes as its dimension, as a fraction of the electrical wavelength, falls significantly below $\lambda/2$. The 'Q' of an electrically short antenna is inversely proportional to the cube of its electrical length. For electrically short antennas particularly, this high 'Q' limits the possible modulation bandwidth.

While it is possible, with passive components, to match a narrow-band antenna to a single (carrier) frequency, the impedance mismatch presented to the modulation sideband frequencies has the effect of attenuating them, while causing electrical stress to the power amplifier in these mis-match conditions.

Another prior art technique is described in a publication by Blinchikoff and Zverev which explained a means to broadband an antenna using passive, filter synthesis strategies. While effective in extending usable bandwidth, that system is still ultimately bound by the Bode-Fano limit.

Also broadbanding strategies using Non-Foster circuits have been applied in receive circuits. Using such amplifier circuitry to synthesize negative capacitive and inductive elements, the Bode-Fano limit can be effectively circumvented. However, because of the limited dynamic range and electrical inefficiency of the Non-Foster circuit elements, these approaches are often impractical in transmit applications.

Consequently, there exists a need for improved methods and systems for efficiently transmitting with electrically short antennae.

SUMMARY OF THE INVENTION

It is an object of the present invention to provide a system and method for efficiently transmitting with an electrically short antenna.

It is a feature of the present invention to utilize a switched impedance synthesis transmit antenna matching system.

It is another feature of the present invention to include a new circuit topology capable of synthesizing arbitrary impedances.

It is yet another feature of the present invention to utilize dynamically variable synthesized arbitrary impedances in a load matching system.

It is an advantage of the present invention to efficiently transmit broadband signals from an electrically short antenna.

The present invention is a system and method for matching an electrically short antenna to a power amplifier, which invention is designed to satisfy the aforementioned needs, provide the previously stated objects, include the above-listed features, and achieve the already articulated advantages.

Accordingly, the present invention is a system and method including a plurality of circuits each configured for synthesizing an arbitrary impedance, arranged in a configuration so as to permit efficient transmission of a broadband signal over an electrical short antenna.

BRIEF DESCRIPTION OF THE DRAWINGS

FIG. 4 is circuit diagram of the present invention showing one embodiment of the present invention which utilizes two building block circuits of FIG. 2 in a representative Pi network configuration.

DETAILED DESCRIPTION OF THE INVENTION

Figure 1:
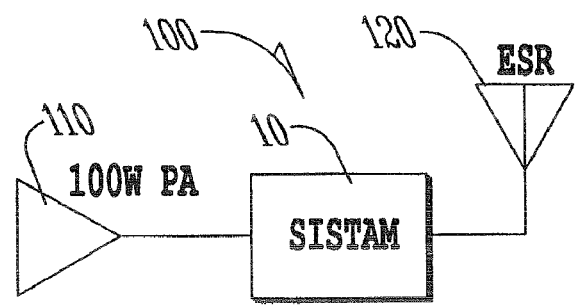
FIG. 1 is a simplified block diagram of an embodiment of the present invention showing a switched impedance synthesis transmit antenna matching block disposed between the amplifier and the antenna.

The following description is focused upon the system and method of the present invention in association with transmit antennas. It should be understood that this use of transmit antennas is merely an example, and receive antennas could be utilized as well.

Now referring to FIGS. 1-4, there are shown systems of the present invention which utilize techniques of load modulation to dynamically vary impedance matching and transformation of a narrow-bandwidth antenna to a power amplifier generating a complex modulation waveform, and to synthesize a network bearing a flat amplitude response and a group delay over the modulation bandwidth.

In the simplest case, a narrow bandwidth antenna is modeled as a series resonant L-R-C circuit. Placing a dynamically-controlled, variable reactive element in series with the antenna allows the reactive component of the antenna impedance to be subtracted at any given frequency. For a constant envelope, frequency-or-phase modulated signal, it is possible to control the variable series element to provide a net resistive impedance for an antenna circuit.

Consider next the case where sine-wave modulated, full-carrier amplitude modulation is applied to the above-described circuit. Such a waveform consists of a carrier, and two in-phase sideband frequencies. Assume that the antenna circuit is tuned to the carrier frequency of the power amplifier signal. If the frequency of modulation exceeds the bandwidth of the antenna, the sideband frequencies will be attenuated, and the effective depth of modulation effectively reduced. This can be compensated for to some degree by modulation pre-emphasis at the power amplifier, but this technique will ultimately be limited by the dynamic range of the power amplifier.

If the antenna voltage and current waveforms are examined during amplitude modulation, it will be observed that while the current is in-phase with the voltage, the ratio of voltage to current changes with the modulation waveform, effectively creating a modulation of the antenna impedance as a function of the applied modulation.

It is then possible to add a second, dynamically-controlled, variable reactive element, shunting to ground across the antenna circuit. The combination of these two elements forms an impedance matching network that can dynamically convert this equivalent modulated antenna impedance to a constant load impedance. The result of this will be a restoration of the amplitude of the sideband components to effectively create a broad-banding effect of this antenna.

It will be noted that the electrical phase shift through such a network will be a function of the circuit components, as determined by the instantaneous impedance to be matched. Consequently, this circuit will exhibit an incidental phase modulation of the transmitted signal per the amplitude modulation applied. This has the equivalent effect of being a network with a non-flat group delay. The implications of non-flat group delay on a modulated signal are to upset the phase relationships of the sideband frequency components, which affects the received signal integrity.

Adding a third, dynamically-controlled, variable reactive element allows control both of impedance match, as well as phase shift through the network.

Now more specifically referring to FIG. 1, there is shown a simplified block diagram of the present invention, generally designated 100, including a transmitter power amplifier 110, a switched impedance synthesis transmit antenna matching system 10 and an electrically short radiator 120.

Figure 2:
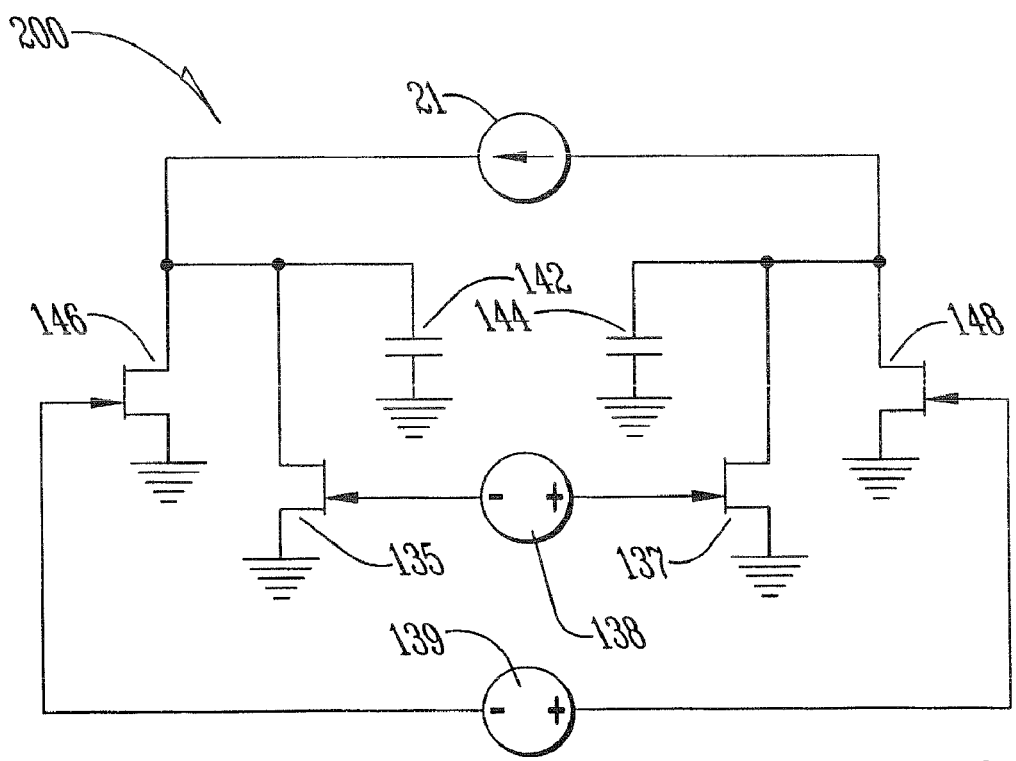
FIG. 2 is a circuit diagram of the present invention which is capable of synthesizing arbitrary impedances.

Now referring to FIG. 2, there is shown a circuit topology capable of synthesizing arbitrary impedances. This allows the creation of matching networks which are not constrained by gain-bandwidth limitations, and are not possible using passive elements.

The circuit 200 operates in a push-pull switched mode, and may be transformer coupled to the output antenna. Note, a circuit 200 could be coupled in series with the inductor 140 (FIG. 4). The antenna load could be connected to the secondary port of the transformer modeled as a current source 21. No bias is applied to the devices, and the circuit 200 will consequently draw zero DC power. Drive power, supplied by drives/control signal sources 138 and 139, is required to switch the gates 146, 135, 137, and 148; however, this power is well below the power needed for the transmitter power amplifier. As an example, in a system with a 50% efficient 100 W transmitter power amplifier, dissipating 100 watts, less than 5 watts would be needed to drive the circuit 200. The phase difference between the switch drive voltage and the RF current allows the circuit to mimic an arbitrary capacitive reactance between the capacitance of capacitor 142, capacitor 144 of the switch and an infinite capacitance.

Figure 3:
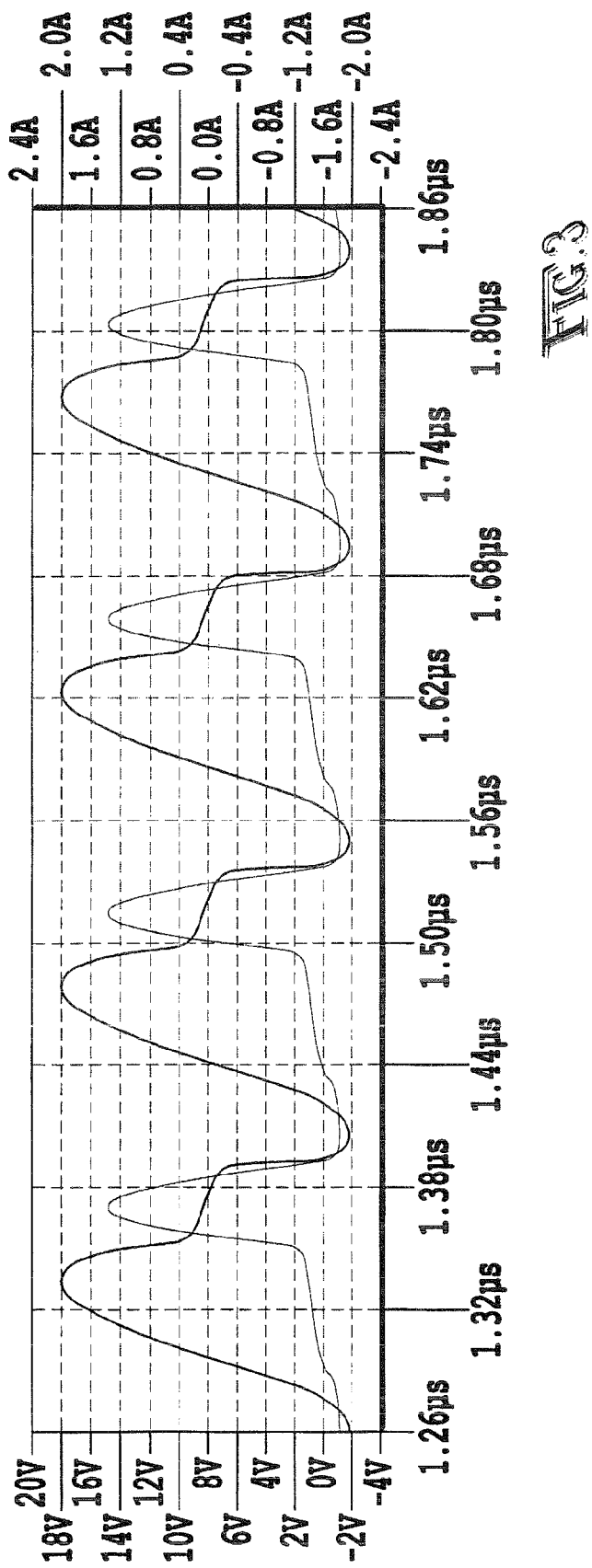
FIG. 3 is a graph showing current and voltage waveforms for a circuit of FIG. 2.

FIG. 3 shows current and voltage waveforms for a switched impedance synthesizing circuit, with a 135-degree phase delta between the switch drive/control signal source 139. Analysis of this and further waveforms shows that the switched impedance synthesizing circuit looks electrically like a capacitor with $C'=C1/\sin F$ where F is the phase shift between drive 139 and load current.

This arbitrary capacitance in conjunction with a fixed inductance 140 (FIG. 4) allows the synthesis of negative capacitance. This negative capacitance, similar to non-foster approach, negates the high reactance of the antenna and allows for a much easier real-to-real transformation.

Now referring to FIG. 4, there is shown a specific embodiment of the present invention which includes a transmitter power amplifier 110, a transmit antenna 120, and a fixed inductor 140 in series.

Also shown is a first switched impedance synthesis circuit 130 which is coupled to fixed inductor 140 via transformer 132 having inductors 134 and 136. First switched impedance synthesis circuit 130 is also shown in FIG. 2. Similarly, second switched impedance synthesis circuit 150 is coupled to the fixed inductor 140 via transformer 152 having inductors 154 and 156. Second switched impedance synthesis circuit 150 may be identical to first switched impedance synthesis circuit 130, and is shown here having gates 168 and 166, Capacitors 162 and 164, as well as drives/sources of control signals 158 and 159.

Note, well-known drive circuitry can be provided to drives/sources of control signals 158 and 159.

While FIG. 4 shows a switched impedance synthesis transmit antenna matching system with just two switched impedance synthesis circuits in a Pi configuration, it should be understood that additional circuits could be used as well, and other configurations, such as 'El', 'Tee', 'Pi', dual Pi, dual Tee, etc. could be used.

If three or more circuits are used, then the values of the three—or more—element network are varied per the applied modulated RF waveform to match the instantaneous antenna impedance to the power amplifier, and to do so while providing a fixed phase shift to the modulated RF center frequency. In so doing, the requirements of flat amplitude response and flat group delay are met.

While not shown in the Figures, there are a number of means of determining the control signal to drive/sources of control signals 138 and 139.

It is first required to know the instantaneous complex impedance of the antenna under the applied modulation. This may be obtained through a number of means. One would be to obtain prior knowledge of the antenna impedance over the frequency range of interest. With information of the modulation baseband signal, the effective instantaneous impedance of the antenna under complex modulation may be calculated.

Alternately, the voltage and current at the antenna feedpoint may be sampled, and from their ratio, the complex antenna impedance may be calculated.

From this information, the circuit components required to provide the appropriate impedance matching and transformation, at a fixed phase shift, may be derived using filter synthesis techniques.

Alternately, the control of the dynamically variable elements may be placed in the control of feedback loops, set to force the antenna voltage and current to track that of the power amplifier.

Additionally, a combination of amplitude and/or phase pre-emphasis may be applied to the power amplifier signal in conjunction with this invention to enhance the performance of the system, or compensate for limitations of the circuit. It is possible, for example, to pre-distort the group-delay of the power amplifier signal to compensate for the non-flat group delay of a two-element dynamic impedance matching network.

It should be understood that the dynamically controllable reactive elements can be varactors, ferroelectric devices, saturable reactors, magnetic amplifiers and the switched capacitor impedance synthesis circuits such as those disclosed above.

While the circuit 130 is shown having capacitors 142 and 144 to synthesize reactive capacitance, it should be understood that inductors could be used to create reactive inductance. The modification of FIGS. 2 and 4 to switch the use of capacitors and inductor (except for transformers) is straight forward and need not be laboriously repeated here.

In addition to application with electrically short antennas, this technique is also applicable to more-optimal resonant antennas for the purpose of extending transmission bandwidth.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:

1. A system for transmitting information comprising:
   a transmit signal source of a broadband variable transmission signal;
   an electrically short antenna coupled to said transmit signal source for radiating said broadband variable transmission signal;
   a first dynamically controlled variable reactive element disposed in series with said electrically short antenna;
   a second dynamically controlled variable reactive element shunting to ground across an antenna circuit of said electrically short antenna and said first dynamically controlled variable reactive element; and
   a source of control signals which is responsive to both a voltage level and a current level of said broadband variable transmission signal from said transmit signal source and coupled to and configured to provide dynamic control of said first dynamically controlled variable reactive element and said second dynamically variable reactive element, in response to said broadband variable transmission signal.

2. A system of claim 1 wherein said second dynamically controlled variable reactive element is a transformer coupled impedance synthesizing circuit.

3. The system of claim 2 wherein said transformer coupled impedance synthesizing circuit comprises a plurality of capacitors, each of which is variably shunted to ground via a first gate which is responsive to said voltage level of said broadband variable transmission signal and shunted to ground via a second gate which is responsive to said current level of said broadband variable transmission signal.

* * * * *